3,687,728
ALKALINE BUFFER FOR GRANULAR STARCH MODIFICATION REACTION
Anangur V. Subbaratnam, Omaha, Nebr., and Eugene L. Powell, Chicago, Ill., assignors to American Maize Products Company
No Drawing. Filed Nov. 2, 1970, Ser. No. 86,310
Int. Cl. C13l 1/08
U.S. Cl. 127—70          6 Claims

ABSTRACT OF THE DISCLOSURE

Process of modifying ungelatinized starch which includes adding a water soluble alkali metal salt of an amphoteric metal compound to an aqueous starch slurry to achieve a pH in the range of 9 to 12.5. The process is conducted at temperatures below the gelatinization temperature of the starch.

---

The present invention relates to a series of compounds useful as alkalizers and buffers in granular starch modification reactions. The compounds which have been found to to be useful for this purpose are the alkali metal salts of amphoteric metal compounds such as silicates, aluminates, stannates, zincates, chromates and plumbates.

In the commercial manufacture of starch, virtually all starches are produced by some type of wet milling process. If it is desired to further modify the starch the most direct and economical process for doing this is while the starch is still suspended in water. The raw insoluble granules are reacted and then by-products are removed by washing, filtering and drying, leaving the modified starch.

In order to modify starch, it is usually necessary to ionize the hydroxy groups in the starch and this ionization is best accomplished by making the starch solution highly alkaline. For this, a pH of at least about 9 is required and preferably the pH must be above about 10. While a strong alkaline solution is thus highly desirable, care must be taken not to exceed a pH of 12 since the starch granules will swell or dissolve and gel when the solution is alkaline above pH 12. This, of course, is highly undesirable since it results in clogging of the tanks, pipes, pumps, etc. and can shut down the entire process necessitating costly delays.

The most commonly used alkali for starch modification reactions is sodium hydroxide. However, to prevent the pH from rising above 12 in any part of the reaction vessel the sodium hydroxide must almost always be diluted to less than about 4% concentration before injecting it into the starch slurry. This is highly undesirable since the reaction vessels must have increased capacity to hold the excess water introduced with the sodium hydroxide. Additionally, the chemicals used to modify starch usually react with water so dilution of the slurry causes a loss in reaction efficiency as evidenced by the need for more reagents to complete the reaction and the formation of unwanted by-products which must be separated from the modified starch, as for example by filtering and washing.

The disadvantage of using dilute sodium hydroxide is especially apparent in continuous flow reactors. Most starch modification reactions are quite rapid and can be conducted in continuous flow reactors wherein the starch modifiers are injected into the starch slurry and the starch slurry is continuously moving through the reaction site. While diluted sodium hydroxide can be used in the continuous reactor, it is highly disadvantageous because of the huge tank capacity necessary and because of the powerful agitators required to continuously mix the slurry. Additionally, the reaction of the chemical reagents with water as hereinbefore described is especially apparent in a continuous reactor.

It has now been discovered that the alkali metal salts of the amphoteric metal compounds may be used to increase the alkalinity of the starch slurry to the necessary pH and that there is a great advantage in this since it can be used in a highly concentrated form and because of the water binding effect of these compounds the pH may be raised to 12.5 without fear of causing swelling or gelatinization. Concentrations of the salts can range as high as 55% by weight and higher, thereby greatly reducing the amount of water introduced into the solution with the pH adjusting agent.

The preferred amphoteric metal compounds are the silicates, aluminates, stannates, zincates, plumbates and chromates and best results have been achieved with silicate.

The preferred alkali metals to be used in the present invention are sodium, lithium, and potassium and best results have been obtained with sodium.

Sodium silicate has been found to give excellent results in the practice of the present invention. Sodium silicate is usually expressed as $SiO_2/Na_2O$ ratio. The selection of the proper weight ratio is well known in the art. Excellent results have been obtained with weight ratios $SiO_2/Na_2O$ from about 1.60 to about 3.25.

Other alkali metal salts of amphoteric metal compounds may also be used in the practice of the present invention and the only limitation is that the salt must be soluble in water.

The amount of the salt to be added to the starch slurry depends upon the pH desired, the nature of the starch, the reaction to be carried out and other related factors. The proper amount of salt to be added to obtain the desired pH for the reaction is well within the knowledge of those skilled in the art.

In addition to increasing the alkalinity of the reaction mixture to the desired high pH, the salts of the amphoteric metal compounds have additional advantage in that they inhibit starch gelatizination at high alkalinity of pH 12.5 since they are believed to bind the water present and prevent hydration of the starch. They also act as a buffer and neutralize the acids normally formed during the starch modification reaction thereby eliminating the necessity of stepwise or continuous additions of additional alkali to keep the slurry at the desired pH.

These and other advantages of the present invention may be more fully understood with reference to the following examples:

EXAMPLE 1

One kg. dry basis, corn starch granules were slurried in 2 liters of water at 48° C. 35.5 g. of a 39% solution (14.2 g. dry basis) of sodium silicate (O brand, Philadelphia Quartz Co.) was added which increased the pH to 10.2. Then 7.5 g. of acetic anhydride was added over a twenty minute period. The granular product was filtered, washed and dried. The Corn Industries Viscometer cooking curve at 5.5% dry basis starch showed an initial pasting temperature of 80.5° C. with a peak viscosity of 270 gm.-cm. at fifteen minutes followed by breakdown of 34 gm.-cm. at thirty minutes of cooking. The breaking strength of the 24 hour gel from this cook was 65 g. These data show that acetylation of the raw starch granules has been effected.

EXAMPLE 2

Example 1 is repeated with potassium silicate used in place of sodium silicate. Comparable results are obtained.

EXAMPLE 3

Example 1 is repeated with potassium aluminate used in place of sodium silicate. Comparable results are obtained.

EXAMPLE 4

Waxy maize starch granules, 1.2. kg. dry basis, were slurried in 2.1 liters of water at 25° C. 51 g. of sodium silicate solution O brand was added which brought the pH to 10.5. Then, 0.55 g. of phosphorus oxychloride was added. After fifteen minutes, 24 g. of acetic anhydride was added over a twenty minute period. The granular product was then filtered, washed and dried. The 5.5% dry basis cooking curve on this starch showed an initial pasting temperature of 68° C., a peak viscosity of 808 gm.-cm. at 6.5 minutes and a breakdown of 176 gm.-cm. The 24 hour gel was 16 g. and the acetyl content 0.31%. Thus, both cross-linking and acetylation had been accomplished.

EXAMPLE 5

Example 4 is repeated with sodium hydroxoplumbate used in place of sodium silicate. Comparable results are obtained.

EXAMPLE 6

Example 4 is repeated with potassium hydroxostannate used in place of sodium silicate. Comparable results are obtained.

EXAMPLE 7

Waxy maize starch granules, 300 g. dry basis, were slurried in 500 ml. of water at 31° C. 21 g. sodium silicate solution O brand was added resulting in a pH of 10.45. Then, 0.3 g. of phosphorus oxychloride was added. After fifteen minutes 7.25 g. acetic anhydride and 0.6 gm. of succinic anhydride were added over a 30 minute period. The granular product was filtered, washed and dried. The cooking curve at 5.5% dry basis starch showed an initial pasting temperature of 68.4° C., a peak viscosity of 340 gm.-cm. and no viscosity breakdown between 14 and 30 minutes of cooking. The 24 hour gel strength was 14 gm. and the acetyl content 0.67%, showing both a high degree of cross-linking and a good efficiency for the acetylation.

EXAMPLE 8

Example 7 is repated with lithium chromate used in place of sodium silicate. Comparable results are obtained.

EXAMPLE 9

Example 7 is repeated with sodium aluminate used in place of sodium silicate. Comparable results are obtained.

EXAMPLE 10

To 1 kg. corn starch granules in 2 liters of water was added 100 g. of the B–W brand (Philadelphia Quartz Co.) high alkalinity 54% sodium silicate solution which raised the pH to 11.8. With the temperature at 16° C., 40 gm. of ethylene oxide was bubbled in over a 30 minute period. The slurry was then slowly warmed to 40° C. A check at 4 hours showed the reaction 72% towards completion (completion meaning that 100% of the ethylene oxide and by-product chlorohydrins have reacted with starch or water). At 6 hours the reaction was 97.5% towards completion. The batch was neutralized with dilute hydrochloric acid, the granules filtered and dried (without washing). This starch at 5% dry basis gave a cooking curve with an initial pasting temperature of 77.6° C., a peak viscosity of 268 gm.-cm. at ten minutes and a 106 gm.-cm. viscosity breakdown at 30 minutes cooking. The analysis for attached hydroxyethyl groups showed 2.3% which is a reaction efficiency of 57.5%. This compares quite favorably with the 40–50% reaction efficiency normally attained with the sodium hydroxide-sodium sulfate procedure.

EXAMPLE 11

Example 10 is repeated with sodium hydroxostannate used in place of sodium silicate. Comparable results are obtained.

EXAMPLE 12

Two kg. of corn starch granules were slurried in 4 liters of water and 150 g. of B–W brand sodium silicate solution was added to attain a pH of 11.25. Then 30 g. of chlorine gas was bubbled into the slurry over a 2 hour period. With a high concentration of sodium chloride present, there is some danger of silica gel formation if one acidifies the slurry. Consequently, the first filtration was carried out at pH 8.75 to remove excess silicate. Then the starch granules were reslurried in water adjusted to pH 6.4 and filtered again. This starch at 8% dry basis showed a cooking curve with initial gelatinization temperature of 71° C., a peak viscosity of 802 gm.-cm. at 6.5 minutes with a 402 gm.-cm. viscosity breakdown at 30 minutes of cooking. Analysis showed 0.14% attached carboxyl groups. Thus, the procedure had been quite effective in producing an oxidized starch with properties like those attained with the usual sodium hypochlorite oxidation procedures.

EXAMPLE 13

One kg. of corn starch granules, dry basis, were slurried in 2 liters of water with 150 g. of B–W brand sodium silicate solution to give a pH of 11.5. Then 50 g. of the sodium salt of monochloroacetic acid was added and the temperature was held between 40° C. and 48° C. Since this is typically a sluggish reaction, it was allowed to run for 21 hours. The batch was filtered while still alkaline, washed (with pH adjustment to 6.6) and the granules dried. This product had a cooking curve at 4.5% dry starch basis with initial gelatinization temperature of 82.9° C., a peak viscosity of 220 gm.-cm. at ten minutes and a 56 gm.-cm. viscosity breakdown at thirty minutes. Analysis showed a carboxyl content of 0.17% attached to the starch showing that a carboxymethyl starch had been obtained.

It will be understood that it is intended to cover all changes and modifications of the preferred embodiments of the invention, herein chosen for the purpose of illustration, which do not constitute departures from the spirit and scope of the invention.

What is claimed is:

1. In the modification of ungelatinized starch granules in aqueous media the improvement which comprises the steps of adding a water soluble alkali metal salt of an amphoteric metal compound to the aqueous media to adjust the pH of the media to above about 9 and less than about 12.5 and carrying out the modification at temperatures below the gelatinization temperature of the starch granules.

2. The method of claim 1 wherein the alkali metal salt of the amphoteric metal compound raises the pH to above about 10 and below about 12.

3. The method of claim 1 wherein the amphoteric metal compound is selected from the group consisting of aluminates, stannates, silicates, zincates, plumbates and chromates.

4. The method of claim 1 wherein the alkali metal is selected from the group consisting of potassium, sodium and lithium.

5. In the modification of ungelatinized starch granules in aqueous slurry, the improvement which comprises the step of adding a compound selected from the group consisting of sodium silicate and sodium aluminate in an amount sufficient to raise the pH above about 10 and less than about 12 and carrying out the modification at temperatures below the gelatinization temperature of the starch granules.

6. In the modification of ungelatinized starch granules in aqueous media the improvement which comprises the step of adding a water soluble alkali metal salt of an amphoteric metal compound in an amount sufficient to raise the pH above about 9 and less than about 12.5 and carrying out the modification at temperatures below the gelatinization temperature of the starch granules.

References Cited

UNITED STATES PATENTS 3,264,174  8/1966  Aitken _____ 260—233.3 R

FOREIGN PATENTS 1,024,882  4/1966  Great Britain.

MORRIS O. WOLK, Primary Examiner

S. MARANTZ, Assistant Examiner

U.S. Cl. X.R.

106—210; 260—233.3 R